(12) United States Patent
Sullivan et al.

(10) Patent No.: US 10,035,044 B2
(45) Date of Patent: Jul. 31, 2018

(54) GOLF BALLS INCORPORATING REGENERATING-TYPE MULTI-FUNCTIONAL ANTIOXIDANTS

(71) Applicant: Acushnet Company, Fairhaven, MA (US)

(72) Inventors: Michael J. Sullivan, Old Lyme, CT (US); Brian Comeau, Berkley, MA (US); Michael Michalewich, Norton, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/346,771

(22) Filed: Nov. 9, 2016

(65) Prior Publication Data

US 2017/0050086 A1 Feb. 23, 2017

Related U.S. Application Data

(60) Continuation-in-part of application No. 14/937,985, filed on Nov. 11, 2015, now Pat. No. 9,808,675, which is a continuation-in-part of application No. 13/613,095, filed on Sep. 13, 2012, now Pat. No. 9,227,109, application No. 15/346,771, which is a continuation of application No. 14/987,307, filed on Jan. 4, 2016, which is a division of application No. 13/613,095, filed on Sep. 13, 2012, now Pat. No. 9,227,109.

(51) Int. Cl.
| | |
|---|---|
| A63B 37/12 | (2006.01) |
| A63B 37/00 | (2006.01) |
| A63B 45/02 | (2006.01) |
| C08G 18/48 | (2006.01) |
| C08G 18/76 | (2006.01) |
| C09D 175/08 | (2006.01) |
| C08L 33/02 | (2006.01) |
| C09D 175/04 | (2006.01) |
| A63B 45/00 | (2006.01) |

(52) U.S. Cl.
CPC ...... *A63B 37/0051* (2013.01); *A63B 37/0012* (2013.01); *A63B 37/0022* (2013.01); *A63B 37/0031* (2013.01); *A63B 37/0033* (2013.01); *A63B 37/0039* (2013.01); *A63B 37/0043* (2013.01); *A63B 37/0045* (2013.01); *A63B 37/0062* (2013.01); *A63B 37/0063* (2013.01); *A63B 37/0064* (2013.01); *A63B 37/0065* (2013.01); *A63B 37/0074* (2013.01); *A63B 37/0075* (2013.01); *A63B 37/0076* (2013.01); *A63B 45/02* (2013.01); *C08G 18/4854* (2013.01); *C08G 18/7671* (2013.01); *C08L 33/02* (2013.01); *C09D 175/04* (2013.01); *C09D 175/08* (2013.01); *A63B 37/0009* (2013.01); *A63B 37/0018* (2013.01); *A63B 45/00* (2013.01); *C08L 2205/025* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 3,886,114 | A * | 5/1975 | Beadle ............... | C08K 5/005 252/400.24 |
| 4,931,376 | A * | 6/1990 | Ikematsu ............ | C08F 36/06 430/164 |
| 5,803,831 | A * | 9/1998 | Sullivan ............. | A63B 37/0003 273/DIG. 22 |
| 5,977,264 | A * | 11/1999 | Ichikawa ........... | A63B 37/0003 473/372 |
| 6,037,419 | A * | 3/2000 | Takesue .............. | C08L 23/08 525/329.9 |
| 6,063,869 | A * | 5/2000 | Kashiwagi ......... | A63B 37/0003 473/372 |
| 6,083,119 | A | 7/2000 | Sullivan et al. | |
| 6,150,462 | A * | 11/2000 | Rajagopalan ...... | A63B 37/0003 473/354 |
| 6,187,864 | B1 * | 2/2001 | Rajagopalan ...... | A63B 37/0003 473/372 |
| 6,207,784 | B1 * | 3/2001 | Rajagopalan ...... | A63B 37/0003 473/354 |
| 6,245,862 | B1 * | 6/2001 | Rajagopalan ...... | C08L 77/00 473/373 |
| 6,290,613 | B1 * | 9/2001 | Irii .................... | A63B 37/0003 473/377 |
| 6,395,861 | B1 | 5/2002 | Kennedy, III | |
| 6,506,851 | B2 | 1/2003 | Wu | |

(Continued)

FOREIGN PATENT DOCUMENTS

| | | |
|---|---|---|
| DE | 3725926 | 2/1989 |
| DE | 4406024 | 8/1995 |

(Continued)

OTHER PUBLICATIONS

U.S. Appl. No. 13/534,264, to Michaelwich, et al., filed Jun. 27, 2012.

*Primary Examiner* — Alvin Hunter
(74) *Attorney, Agent, or Firm* — Margaret C. Barker

(57) ABSTRACT

Golf balls having at least one layer comprising a polymer composition comprising a reaction mixture of a base polymer and at least one regenerating-type multi-functional antioxidant. A regenerating-type multi-functional antioxidant has at least two differing moieties selected for example from the group consisting of phenols, phosphites, amines or combinations thereof, and is macromolecular, having a molecular weight of at least 2,000 g/mol. and up to 2,000,000. The at least one layer may comprise at least one regenerating-type multi-functional antioxidant in an amount of from 0.10 to about 2.5 parts by weight per 100 parts by weight of the base polymer, or of less than 0.50 parts by weight per 100 parts by weight of the base polymer, or of less than 0.095 parts by weight per 100 parts by weight of the base polymer. The base polymer can comprise ionomer resin composition(s), polyurethane composition(s) and/or rubber composition(s).

18 Claims, No Drawings

(56) References Cited

U.S. PATENT DOCUMENTS

| | | | |
|---|---|---|---|
| 6,528,578 B2 | 3/2003 | Wu | |
| 6,610,812 B1 | 8/2003 | Wu et al. | |
| 6,822,028 B2* | 11/2004 | Takesue | C08K 5/17 |
| | | | 473/378 |
| 6,939,939 B2 | 9/2005 | Slagel et al. | |
| 7,148,278 B2 | 12/2006 | Bulpett et al. | |
| 7,163,471 B2* | 1/2007 | Kim | A63B 37/0003 |
| | | | 473/378 |
| 7,207,905 B2 | 4/2007 | Aoyama | |
| 7,410,429 B1 | 8/2008 | Bulpett et al. | |
| 7,537,530 B2 | 5/2009 | Bulpett et al. | |
| 7,648,428 B2 | 1/2010 | Nagasawa | |
| 7,678,877 B2 | 3/2010 | Yang et al. | |
| 7,705,075 B2 | 4/2010 | Kumar et al. | |
| 7,705,176 B2 | 4/2010 | Cholli et al. | |
| 7,705,185 B2 | 4/2010 | Kumar et al. | |
| 7,767,853 B2 | 8/2010 | Cholli et al. | |
| 7,799,948 B2 | 9/2010 | Kumar et al. | |
| 7,902,317 B2 | 3/2011 | Kumar et al. | |
| 7,923,587 B2 | 4/2011 | Cholli | |
| 7,956,153 B2 | 6/2011 | Cholli et al. | |
| 7,999,019 B2* | 8/2011 | Nakamura | C08G 18/7664 |
| | | | 473/378 |
| 8,008,423 B2 | 8/2011 | Kumar et al. | |
| 8,039,673 B2 | 10/2011 | Cholli et al. | |
| 8,080,689 B2 | 12/2011 | Kumar et al. | |
| 8,193,263 B2* | 6/2012 | Fujii | C08L 77/00 |
| | | | 524/126 |
| 8,242,230 B2 | 8/2012 | Cholli et al. | |
| 8,252,884 B2 | 8/2012 | Kumar et al. | |
| 8,389,607 B2* | 3/2013 | Nakamura | A63B 37/0023 |
| | | | 473/378 |
| 8,481,670 B2 | 7/2013 | Kumar et al. | |
| 8,551,279 B2 | 10/2013 | Johnson et al. | |
| 8,598,382 B2 | 12/2013 | Cholli et al. | |
| 8,691,933 B2 | 4/2014 | Kumar et al. | |
| 8,710,266 B2 | 4/2014 | Kumar et al. | |
| 8,846,847 B2 | 9/2014 | Cholli et al. | |
| 8,927,472 B2 | 1/2015 | Cholli et al. | |
| 8,956,730 B2 | 2/2015 | Uprety et al. | |
| 8,979,669 B2 | 3/2015 | Greaney et al. | |
| 9,108,364 B2* | 8/2015 | Caruso | B29C 73/22 |
| 9,193,675 B2 | 11/2015 | Cholli et al. | |
| 9,388,120 B2 | 7/2016 | Kumar et al. | |
| 2008/0071016 A1 | 3/2008 | Boettcher et al. | |
| 2012/0100935 A1 | 4/2012 | Michalewich et al. | |
| 2012/0286449 A1 | 11/2012 | Michalewich et al. | |

FOREIGN PATENT DOCUMENTS

| | | |
|---|---|---|
| EP | 31302 | 7/1981 |
| EP | 434618 | 6/1991 |
| EP | 707002 | 4/1996 |
| GB | 2319035 | 5/1998 |
| GB | 2361005 | 10/2001 |

* cited by examiner

GOLF BALLS INCORPORATING REGENERATING-TYPE MULTI-FUNCTIONAL ANTIOXIDANTS

CROSS REFERENCE TO RELATED APPLICATIONS

The present application is a continuation-in-part of U.S. patent application Ser. No. 14/937,985, filed Nov. 11, 2015, which is a continuation-in-part of U.S. patent application Ser. No. 13/613,095, filed Sep. 13, 2012. The present application is also a continuation-in-part of U.S. patent application Ser. No. 14/987,307, filed Jan. 4, 2016, which is a divisional of U.S. patent application Ser. No. 13/613,095, filed Sep. 13, 2012. The entire disclosure of each application is hereby incorporated by reference herein in its entirety.

FIELD OF THE INVENTION

Golf balls that are highly resistant to oxygen, heat, and/or ultra violet (UV) light-related degradation and which meanwhile possess desirable playing characteristics.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Examples of golf ball materials range from rubber materials, such as balata, styrene butadiene, polybutadiene, or polyisoprene, to thermoplastic or thermoset resins such as ionomers, polyolefins, polyamides, polyesters, polyurethanes, polyureas and/or polyurethane/polyurea hybrids, and blends thereof. Typically, outer layers are formed about the spherical outer surface of an innermost golf ball layer via compression molding, casting, or injection molding.

From the perspective of a golf ball manufacturer, it is desirable to have materials exhibiting a wide range of properties, such as resilience, durability, spin, and "feel," because this enables the manufacturer to make and sell golf balls suited to differing levels of ability and/or preferences. In this regard, playing characteristics of golf balls, such as spin, feel, CoR and compression can be tailored by varying the properties of the golf ball materials and/or adding additional golf ball layers such as at least one intermediate layer disposed between the cover and the core. Intermediate layers can be of solid construction, and have also been formed of a tensioned elastomeric winding. The difference in play characteristics resulting from these different types of constructions can be quite significant.

Unfortunately, golf ball polymer compositions are often susceptible to irreversible degradation from exposure to oxygen, heat, and/or ultra violet (UV) light. In this regard, UV light can initiate deteriorating photochemical processes in polymers containing UV absorbent groups or impurities. Aromatic isocyanate-based polyurethane and polyurea polymers are particularly vulnerable to discoloration over time from exposure to UV light rays since aromatic structures are inherently unstable and may be found in the reaction product. Meanwhile, UV light can deteriorate surface properties of an ionomeric layer, resulting in durability issues such as poor adhesion between the ionomeric layer and an adjacent layer. And in rubber materials, destructive peroxy radicals can form during the rubber degradation process.

Antidegradants such as UV absorbers, radical scavengers, peroxide decomposers, and quenchers can protect polymers against the harmful effects of degradation. Since each antidegradant class plays a unique role in protecting a golf ball polymer from deterioration, golf ball manufacturers tend to select an antidegradant based on the specific cause of degradation being addressed.

For example, UV absorbers are helpful to absorb or filter damaging light before a chromosphere (the part of a molecule responsible for its color) can be formed. UV absorbers absorb harmful UV light and transform it into harmless heat. Examples include 2-(2-hydroxyphenyl)-benzotriazoles, 2-hydroxy-benzophenones, hydroxyphenyl-s-triazines, and oxalanilides, each of which are characterized by a specific absoprtion and transmission spectrum. A suitable UV absorber should absorb UV light better and faster than the polymer it is added to protect against, and dissipate absorbed energy before undesirable side reactions occur. Meanwhile, peroxide decomposers decompose peroxides into non-radical and stable products, and quenchers accept energy from excited polymer molecules through an energy transfer mechanism and deactivate chromosphores before the excited states can undergo a reaction resulting in degradation.

On the other hand, free radical scavengers can trap radicals before undesirable reactions (polymer degradation) takes place. Suitable free radical scavengers should be capable of trapping radicals and interrupting the chain reaction that can occur in a polymer when an excited chromophore decomposes to form radicals. Free radicals typically (i) react with the polymer and/or atmospheric oxygen, or (ii) remove a hydrogen atom from the polymer thereby initiating a free radical reaction. Examples of conventional free radical scavengers include sterically hindered amines (HALS) and antioxidants. HALS are typically derivatives of 2,2,6,6-tetraamethylpiperidine and react with a free radical to give the stable nitroxyl radical.

Antioxidants can potentially prolong the service life of a broad range of polymers. Common primary antioxidants include amines and phenolic antioxidants, which are chain terminating. Phenolic antioxidants are often used to inhibit thermo-oxidation at higher processing temperatures (e.g., ≥150° C.) and catalyze formation of a stable phenoxy radical to terminate free radical chain reactions initiated in a polymer. Secondary antioxidants, e.g., phosphites, can decompose peroxide.

However, one drawback with conventional antioxidants is that they typically have a non-cyclic mode of action and become inactive after scavenging a single free radical—which inevitably limits service life of the polymer. Additionally, a "phenolic" yellowing or pinking effect can be created in the resulting polymeric material from the amount of suitable phenolic antioxidant necessary to produce a given protective benefit.

Thus, there is a need for golf balls containing versatile ingredients that can cost effectively prolong protection in thermoset polyurethane/polyurea, ionomeric, and/or rubber-based materials against oxygen, heat, and UV light-related degradation and without the common "phenolic" yellowing or pinking effect produced by conventional phenolic antioxidants. The golf balls of the invention address and solve this need.

SUMMARY OF THE INVENTION

Accordingly, in a golf ball of the invention, at least one layer comprises a polymer composition comprising a reaction mixture of a base polymer and at least one regenerating-type multi-functional antioxidant. In one embodiment, the at least one regenerating-type multi-functional antioxidant has at least two differing moieties selected from the group consisting of phenols, phosphites, or amines or combinations thereof.

In one embodiment, each regenerating-type multi-functional antioxidant has a molecular weight of at least 2,000 g/mol. In another embodiment, each regenerating-type multi-functional antioxidant has a molecular weight of greater than 2,000 g/mol and less than about 10,000 g/mol. In yet another embodiment, each regenerating-type multi-functional antioxidant has a molecular weight of from 5,000 g/mol to about 100,000 g/mol. In still another embodiment, each regenerating-type multi-functional antioxidant has a molecular weight of from 10,000 g/mol to about 2,000,000 g/mol.

Meanwhile, in some embodiments, the regenerating-type multi-functional antioxidant may be included/mixed in the polymer composition in an amount of 0.10 parts by weight or greater per 100 parts by weight of the base polymer; or in an amount of from 0.10 parts by weight to about 5.0 parts by weight per 100 parts by weight of the base polymer; or in an amount of from 0.10 parts by weight to about 2.5 parts by weight per 100 parts by weight of the base polymer; or in an amount of from 0.10 parts by weight to about 1.50 parts by weight per 100 parts by weight of the base polymer; or in an amount of from 0.10 parts by weight to about 0.50 parts by weight per 100 parts by weight of the base polymer.

In other embodiments, the regenerating-type multi-functional antioxidant may be included/mixed in the polymer composition in an amount of less than 0.10 parts by weight per 100 parts by weight of the base polymer; or in an amount of 0.095 parts by weight or less per 100 parts by weight of the base polymer; or in an amount of less than 0.095 parts by weight per 100 parts by weight of the base polymer; or in an amount of 0.090 parts by weight or less per 100 parts by weight of the base polymer; or in an amount of less than or 0.090 parts by weight; or in an amount of 0.085 parts by weight or less per 100 parts by weight of the base polymer.

In one embodiment, the base polymer comprises an ionomer resin composition comprising at least one partially or fully neutralized ethylene-acid copolymer. In a specific embodiment, the at least one layer comprises an inner cover layer surrounding a subassembly, has a thickness of from about 0.020 inches to about 0.050 inches, and a Shore D hardness of from about 40 to about 75.

In another embodiment, the base polymer comprises a thermoset polyurethane composition. In such an embodiment, the polymer composition may comprise a mixture of the at least one regenerating-type multi-functional antioxidant and a reaction mixture of at least one polyol and at least one isocyanate. Alternatively, the polymer composition may comprise a reaction mixture of a curing agent and a mixture of a prepolymer and the at least one regenerating-type multi-functional antioxidant.

In yet another embodiment, the base polymer may comprise: 100 phr of base rubber(s); from about 0.1 phr to about 5.0 phr of initiator(s); up to about 2.5 phr of organosulfur compound(s); from about 5.0 phr to about 50.0 phr of co-agent(s); up to about 50 phr of filler(s); and up to about phr of additives(s).

In one specific embodiment wherein the polymer composition comprises a polyurethane base polymer, a golf ball of the invention may comprise an inner core layer, an outer core layer, an inner cover layer, an outer cover layer, a pigmented solvent-borne primer coat, and a solvent-borne top coat. The inner core layer is formed from a diene rubber composition and has a diameter of from 0.950 inches to 1.015 inches, an Atti compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5. The outer core layer is formed from a diene rubber composition and has a thickness of from 0.250 inches to 0.300 inches and an outer surface Shore C hardness of from 85 to 95. The core assembly consisting of the inner core layer and the outer core layer has an Atti compression of from 80 to 95.

Meanwhile, the inner cover layer is formed from an ionomer composition and has a thickness of from 0.030 inches to 0.040 inches and an outer surface Shore C hardness of 93 or greater. The outer cover layer is formed from a polyurethane composition and has a thickness of from 0.020 inches to 0.035 inches and an outer surface Shore C hardness of from 75 to 90. The polyurethane outer cover layer composition comprises a reaction mixture of a prepolymer and a curing agent, wherein the prepolymer is a reaction mixture of a polyol mixture and a diisocyanate, wherein the polyol mixture comprises at least one regenerating-type multi-functional antioxidant.

In another specific embodiment wherein the polymer composition comprises a polyurethane base polymer, a golf ball of the invention may comprise a core, an inner cover layer, an outer cover layer, a pigmented solvent-borne primer coat, and a solvent-borne top coat.

The core is a solid, single-layer core formed from a diene rubber composition and having a diameter of from 1.510 inches to 1.530 inches, an Atti compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8. The inner cover layer is formed from an ionomer composition and has a thickness of from 0.040 inches to 0.050 inches and an outer surface Shore C hardness of 93 or greater. Meanwhile, the outer cover layer is formed from a polyurethane composition and has a thickness of from 0.030 inches to 0.035 inches, an outer surface Shore C hardness of from 75 to 90. The polyurethane composition comprises a reaction mixture of a prepolymer and a curing agent, wherein the prepolymer is a reaction mixture of a polyol mixture and a diisocyanate, wherein the polyol mixture comprises at least one regenerating-type multi-functional antioxidant.

In either specific embodiment set forth above, the outer cover layer polyurethane composition may further comprise at least one UV absorber. And in a particular embodiment, the UV absorber may be a 2-(2H-benzotriazol-2-yl)-4-(1,1,3,3-tetramethylbutyl)phenol UV absorber.

In an alternative embodiment, a golf ball of the invention comprises at least one layer consisting of a polymer composition comprising a mixture of a base polymer and at least one regenerating-type multi-functional antioxidant. In yet another embodiment, the present invention is directed to a method of manufacturing a at least one golf ball layer comprising combining a base polymer with at least one regenerating-type multi-functional antioxidant to form a polymer composition, and forming the polymer composition into at least one of a spherical inner core and/or other layer such as an outer core layer, intermediate layer, inner cover layer and/or outer cover layer about a golf ball subassembly.

DETAILED DESCRIPTION

Golf balls of the invention advantageously have at least one layer comprising a polymer composition comprising a reaction mixture of a base polymer and at least one regenerating-type multi-functional antioxidant. The mixture of base polymer and at least one regenerating-type multi-functional antioxidant results in a polymer composition (i.e., thermoset polyurethane, ionomer, and/or rubber based polymer) having longer service life and continued protection against and resistance to degradation from oxygen, heat, and UV rays, and meanwhile without the common "phenolic" yellowing or pinking effect.

I. Antidegradent(s)

(i) Regenerating-Type Multi-Functional Antioxidant

As used herein, the term "regenerating-type multi-functional antioxidant", refers to macromolecular antioxidant(s) or polymeric macromolecular antioxidant(s) containing at least two differing active moieties, wherein the concentration of free radicals on a first active moiety decreases upon participating in regenerating a second active moiety in the molecule according equation $W1+W2(H) \rightarrow W1(H)+W2$ (transfer equilibrium). This transfer mechanism can take place between moieties residing on the same macromolecule (intra-regeneration) or residing on different macromolecules (inter-regeneration). The at least two differing moieties may be selected for example from phenols, phosphites, or amines or combinations thereof.

Regenerating-type multi-functional antioxidants, being macromolecules incorporating at least two antioxidant moieties having different reactivities, impart significantly higher antioxidant activity and lower migration over conventional antioxidants, resulting in a longer service life than conventional antioxidants and providing protection over multiple stabilization cycles. The differences in activities (ks equilibrium constant) of at least two differing antioxidant moieties are at least in part responsible for the resulting cyclic mode of action which has a dramatic impact on the service life of a broad range of golf all polymers such as rubber-based, polyurethane and ionomeric materials over conventional antioxidants. In contrast, conventional antioxidants, having a non-cyclic mode of action, become inactive after scavenging a single free radical.

A particularly suitable regenerating-type multi-functional antioxidant has a rate of diffusion through the polymeric material (e.g., thermoset polyurethane/urea, ionomer, rubber) that is less than (or as close to as possible) the typical expected golf ball lifetime. In fact, regenerating-type multi-functional antioxidants significantly outperform (up to a three-fold or greater) conventional antioxidants at a given concentration, which cost effectively reduces the amount of antioxidant necessary to achieve a given protective benefit. In turn, the lesser required amount of antioxidant minimizes the degree of "phenolic" yellowing or pinking effect attributed to antioxidants.

At least one regenerating-type multi-functional antioxidant may be combined with the base polymer in several ways. In one non-limiting embodiment, a base polymeric material can be melted in the presence of at least one regenerating-type multi-functional antioxidant to minimize degradation of the base polymer during processing without negatively impacting and in particular embodiments to improve or otherwise target golf ball properties such as CoR, spin, compression, feel, etc.

Additionally or alternatively, at least one regenerating-type multi-functional antioxidant may be co-extruded with the base polymer.

And meanwhile, at least one regenerating-type multi-functional antioxidant can be added or otherwise combined with one or more of the ingredients of base polymer before being further mixed with the remaining ingredients thereof. One non-limiting example is wherein the base polymer is a polyurethane layer composition comprising a reaction mixture of a prepolymer and a curing agent, wherein the prepolymer is a reaction mixture of a polyol mixture and a diisocyanate, wherein the polyol mixture comprises at least one regenerating-type multi-functional antioxidant.

Suitable regenerating-type multi-functional antioxidants have two or more repeat units, or three or greater repeat unites, or four or more repeat units, or at least five repeat units, and have molecular weights of at least 2000 g/mol (or amu/atom), or greater than about 2000 g/mol, or greater than 2000 g/mol, or from 2,000 g/mol to 5,000 g/mol, or from 2,000 g/mol to 10,000 g/mol, or from 2,000 g/mol to 100,000 g/mol, or from 2,000 g/mol to 250,000 g/mol, or from 2,000 g/mol to 500,000 g/mol, or from 2,000 g/mol to 750,000 g/mol, or from 2,000 g/mol to 1,000,000 g/mol, or from 2,000 g/mol to 2,000,000 g/mol, or 5,000 g/mol to 10,000 g/mol, or from 5,000 g/mol to 100,000 g/mol, or from 5,000 g/mol to 250,000 g/mol, or from 5,000 g/mol to 500,000 g/mol, or from 5,000 g/mol to 750,000 g/mol, or from 5,000 g/mol to 1,000,000 g/mol, or from 5,000 g/mol to 2,000,000 g/mol, or from 10,000 g/mol to 100,000 g/mol, or from 10,000 g/mol to 250,000 g/mol, or from 10,000 g/mol to 500,000 g/mol, or from 10,000 g/mol to 750,000 g/mol, or from 10,000 g/mol to 1,000,000 g/mol, or 10,000 g/mol to 2,000,000 g/mol, or from 100,000 g/mol to 250,000 g/mol, or from 100,000 g/mol to 500,000 g/mol, or from 10,000 g/mol to 750,000 g/mol, or from 100,000 g/mol to 1,000,000 g/mol or from 100,000 g/mol to 2,000,000 g/mol, or from 250,000 g/mol to 500,000 g/mol, or from 250,000 g/mol to 750,000 g/mol, or from 250,000 g/mol to 1,000,000 g/mol or from 250,000 g/mol to 2,000,000 g/mol, or from 500,000 g/mol to 750,000 g/mol, or from 500,000 g/mol to 1,000,000 g/mol or from 500,000 g/mol to 2,000,000 g/mol, or from 750,000 g/mol to 1,000,000 g/mol or from 750,000 g/mol to 2,000,000 g/molor from 1,000,000 g/mol to 2,000,000 g/mol, Meanwhile, in some embodiments, the regenerating-type multi-functional antioxidant may be included/mixed in the polymer composition in an amount of 0.1 parts by weight or greater, or in an amount of from 0.1 parts by weight to about 5 parts by weight, or in an amount of from 0.1 parts by weight to about 2.5 parts by weight, or in an amount of from 0.1 parts by weight to about 2.0 parts by weight, or in an amount of from 0.1 parts by weight to about 1.50 parts by weight, or in an amount of from 0.1 parts by weight to about 1.0 parts by weight, or in an amount of from 0.1 parts by weight to about 0.5 parts by weight. However, in other embodiments, the regenerating-type multi-functional antioxidant may be included/mixed in the polymer composition in an amount of less than 0.10 parts by weight, or in an amount of 0.095 parts by weight or less, or in an amount of less than 0.095 parts by weight, or in an amount of 0.090 parts by weight or less, or in an amount of less than or 0.090 parts by weight, or in an amount of 0.085 parts by weight or less, or in an amount of less than 0.085 parts by weight, or in an amount of 0.080 parts by weight or less, or in an amount of less than 0.080 parts by weight.

Suitable regenerating-type multi-functional antioxidants for incorporating in thermoset polyurethane, ionomeric and/ or rubber-based layers of golf balls of the invention can be produced applying the general mechanisms set forth in U.S. Pat. Nos. 7,678,877; 7,705,075; 7,705,176; 7,705,185; 7,767,853; 7,799,948; 7,902,317; 7,923,587; 7,956,153; 8,008,423; 8,039,673; 8,080,689; 8,242,230; 8,252,884; 8,481,670; 8,598,382; 8,691,933; 8,710,266; 8,846,847; 8,927,472; 9,193,675; and/or 9,388,120, each of which is incorporated by reference herein in its entirety.

Embodiments are also envisioned wherein a coating composition mixture incorporating at least one regenerating-type multi-functional antioxidant is formed about an inner golf ball layer and protect the inner layer from degradation and meanwhile has a water vapor transmission rate low enough to prevent moisture from penetrating the outer surface of the inner layer. Such a moisture vapor barrier layer has a moisture vapor transmission rate that is lower than a moisture vapor transmission rate of the inner layer, and therefore, an effective moisture barrier layer is formed about the inner layer having a water vapor transmission rate that is low enough to create a barrier against moisture penetration into the enveloped material and thereby protect the material against the negative effects of water. For example, a moisture vapor barrier layer resulting from a reaction mixture of a base ionomeric polymer and at least one regenerating-type multi-functional antioxidant may have a moisture vapor transmission rate in the range of from about 0.45 to about 0.95 grams.mm/m$^2$.day.

(ii) Additional Antidegradents such as UV Absorbers

It is envisioned that UV absorbers can also be included such as triazines, benzoxazinones, benzotriazoles, benzophenones, benzoates, formamidines, cinnamates/propenoates, aromatic propanediones, benzimidazoles, cycloaliphatic ketones, formanilides, cyanoacrylates, benzopyranones, salicylates, substituted acrylonitriles, and combinations thereof.

Preferred substituted triazines include those having the formula:

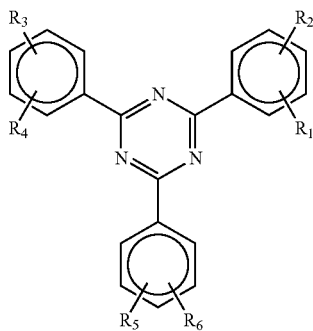

wherein $R_1$ is H, OH; $R_2$ is H, alkoxy, alkylester, hydroxyalkoxy; $R_3$ is alkyl, H; $R_4$ is alkyl, H, alkylester; $R_5$ is alkyl, H; and $R_6$ is alkyl, H, alkylester.

Preferred benzoxazinones include those including the formula:

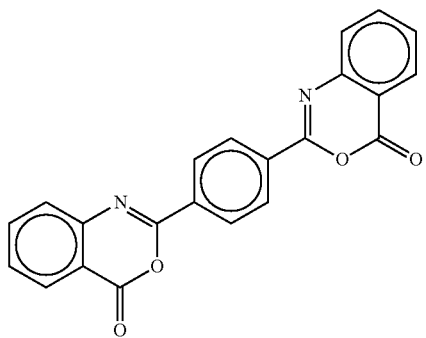

Preferred benzotriazoles include those having the formula:

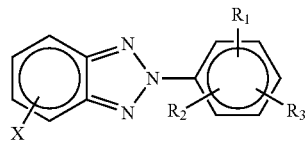

wherein $R_1$ is OH; $R_2$ is alkyl, hydroxyalkyl, acryloxyalkyl, (hydroxyphenyl)alkyl, (alkylester)alkyl, (hydroxyalkylether)oxoalkyl, phenylalkyl; $R_3$ is H, alkyl; and X is Cl, Br, I.

Preferably X is Cl.

Preferred benzophenones include those having the formula:

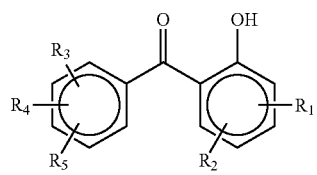

wherein $R_1$ is OH, alkoxy, alkenoic acid alkoxyester, aryloxy, hydroxyalkoxy, hydroxy(alkylether)alkoxy, (polymerized acrylo)alkoxyester, o-alkyl acid ester; $R_2$ is H, $SO_3H$, $SO_3Na$; and $R_3$ is H, OH; $R_4$ is H, alkoxy, OH; and $R_5$ is H, $SO_3Na$.

Preferred benzoates include those having the formula:

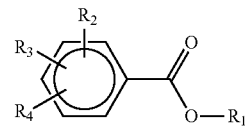

wherein $R_1$ is hydroxyalkylether, alkylphenyl, alkyl, phenyl, hydroxyphenyl; $R_2$ is H, OH, alkyl, hydroxy(alkylether) amino; $R_3$ is H, alkyl, OH; and $R_4$ is H, alkyl.

Preferred formamidines include those having the formula:

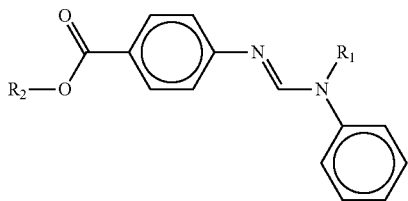

wherein $R_1$ is alkyl, $R_2$ is alkyl.

Preferred cinnamates or propenoates include those having the formula:

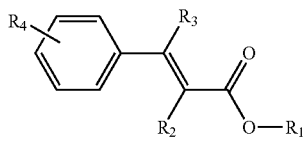

wherein $R_1$ is alkyl; $R_2$ is alkylester, cyano; $R_3$ is H, phenyl; and $R_4$ is H, alkoxy.

Preferred aromatic propanediones include those having the formula:

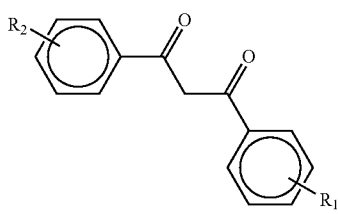

wherein $R_1$ is alkoxy; and R2 is alkyl.

Preferred benzimidazoles include those having the formula:

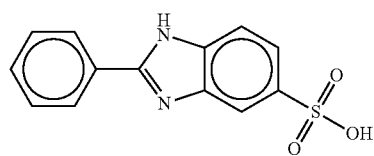

Preferred cycloaliphatic ketones include those having the formula:

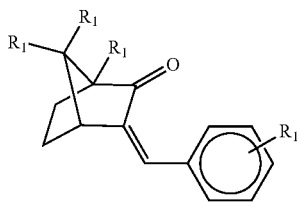

wherein $R_1$ is alkyl.

Preferred formanilides (including oxamides) include those having the formula:

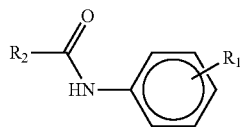

wherein $R_1$ is alkyl; $R_2$ is H, formanilide, alkylalkoxy, and/or contains benzimidazole.

Preferred cyanoacrylates include those having the formula:

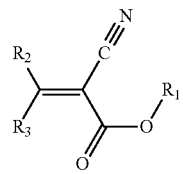

wherein $R_1$ is alkyl, arylcyanoacrylalkyl; $R_2$ is phenyl, H, alkylindoline; and $R_3$ is H, phenyl.

Preferred benzopyranones include those having the formula:

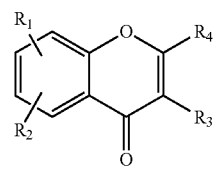

wherein $R_1$; $R_2$; $R_3$; and $R_4$ are OH.

Preferred salicylates include those having the formula:

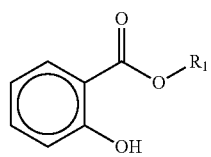

wherein $R_1$ is a linear, cyclic, or branched alkyl group.

Suitable UV absorbers also include inorganic pigments such as titanium dioxide, zinc oxide, barium sulfate, violet, Paliogen® Blue L 6385 indanthrone blue pigment, ultra marine blue, and other blue pigments; and combinations thereof.

Non-limiting examples of suitable commercially available UV absorbers are Tinuvin® and Uvinul® ultraviolet light absorbers, commercially available from BASF; Cyasorb® light stabilizers, commercially available from Cytec Industries Inc.; Hostavin® light stabilizers, commercially available from Clariant Corporation; Maxgard® UV stabilizers, commercially available from Syrgis; Seesorb UV absorbers, commercially available from Shipro Kasei Kaisha; Mark® organo based stabilizers, commercially available from Chemtura; Givsorb® UV absorbers, commercially available from Givaudan Corporation; and Neo Heliopan® UV absorbers, commercially available from Symrise AG.

Suitable UV absorbers are further disclosed, for example, in U.S. Pat. No. 5,156,405 to Kitaoh; U.S. Pat. No. 5,840, 788 to Lutz; and U.S. Pat. No. 7,722,483 to Morgan; the entire disclosures of which are hereby incorporated herein by reference.

In a particular embodiment, the UV absorber may be a benzotriazole, particularly selected from: 2-(2H-benzotriazol-2-yl)-4-(1,1,3,3-tetramethylbutyl)phenol; 2-(5-chloro-2H-benzotriazole-2-yl)-6-(1,1-dimethylethyl)-4-methylphenol; 2-(2H-benzotriazol-2-yl)-6-dodecyl-4-methylphenol; 2-(2H-benzotriazol-2-yl)-4,6-bis(1-methyl-1-phenylethyl) phenol; 2-(5-chloro-2H-benzotriazole-2-yl)-6-(1,1-dimethylethyl)-4-methylphenol; 2-(2H-benzotriazol-2-yl)-4,6-ditertpentylphenol; and 2-(2H-benzotriazol-2-yl)-6-(1-methyl-1-phenylethyl)-4-(1,1,3,3-tetramethylbutyl)-phenol. In another particular embodiment, the UV absorber may be 2-(2H-benzotriazol-2-yl)-4-(1,1,3,3-tetramethylbutyl)phenol.

Particularly suitable commercially available UV absorbers include, but are not limited to, Tinuvin® 329 2-(2H-benzotriazol-2-yl)-4-(1,1,3,3-tetramethylbutyl)phenol, Tinuvin® 326 2-(5-chloro-2H-benzotriazole-2-yl)-6-(1,1-dimethylethyl)-4-methylphenol, Tinuvin® 571 2-(2H-benzotriazol-2-yl)-6-dodecyl-4-methylphenol, Uvinil® P25 4-bis(polyethoxy)paraaminobenzoic acid polyethoxyethyl ester, Tinuvin® 213 reaction product of methyl 3-(3-(2H-benzotriazole-2-yl)-5-t-butyl-4-hydroxyphenyl) propionate/ PEG 300, Uvinil® 3039 (2-ethylhexyl)-2-cyano-3,3-diphenylacrylate, Uvinil® 3030 1,3-bis-[(2'-cyano-3',3'-diphenylacryloyl)oxy]-2,2-bis-{[(2'-cyano-3',3'-diphenylacryloyl)oxy]methyl}-propane, Uvinil® 3035 ethyl-2-cyano-3,3-diphenylacrylate, Uvinil® 3049 2,2-Dihydroxy-4,4-dimethoxybenzophenone, Tinuvin® P 2-(2H-benzotriazol-2-yl)-p-cresol, Chimassorb® 81 benzophenone UV absorber, Tinuvin® 460 a hydroxyphenyl-triazine UV absorber, Tinuvin® Carboprotect® a red-shifted benzotriazole-based UV absorber, Tinuvin® 328 2-(2H-benzotriazol-2-yl)-4,6-ditertpentylphenol, and Tinuvin® 928 (2-(2H-benzotriazol-2-yl)-6-(1-methyl-1-phenylethyl)-4-(1,1,3,3-tetramethylbutyl)-phenol, commercially available from BASF; Irgafos® 168 tris(2,4-ditert-butylphenyl)phosphite UV absorber, commercially available from Ciba®; Uvasorb® S34 2-(2H-Benzotriazol-2-yl)-4,6-bis(1-methyl-1-phenylethyl)phenol and Uvasorb® S26 2-(5-chloro-2H-benzotriazole-2-yl)-6-(1,1-dimethylethyl)-4-methylphenol, commercially available from 3V Inc.; UV-Check® AM-300 2-hydroxy-4-(octyloxy)benzophenone and UV-Check® AM-340 2,4 di-tert-butylphenyl 3,5-di-tert-butyl-4-hyroxybenzoate, commercially available from Ferro Corporation; and Songlight® 2920 LQ bis(1,2,2,6,6-pentamethyl-4-piperidyl) sebacate, commercially available from Songwon Chemical.

II. Base Polymers
(i) Thermoset Polyurethanes
(a) Polyol

Any polyol available to one of ordinary skill in the art is suitable for use in the polyurethane prepolymer. Exemplary polyols include, but are not limited to, polyether polyols, polycaprolactone polyols, polyester polyols, polycarbonate polyols, and hydrocarbon polyols. The hydrocarbon chain of the polyol can have saturated or unsaturated bonds, or substituted or unsubstituted aromatic and cyclic groups.

Suitable polyether polyols include, but are not limited to, polytetramethylene ether glycol (PTMEG); copolymers of polytetramethylene ether glycol and 2-methyl-1,4-butane diol (PTG-L); poly(oxyethylene) glycol; poly(oxypropylene) glycol; ethylene oxide capped (polyoxypropylene) glycol; poly(oxypropylene oxyethylene) glycol; and combinations thereof.

Suitable polycaprolactone polyols include, but are not limited to, diethylene glycol initiated polycaprolactone; propylene glycol initiated polycaprolactone; 1,4-butanediol initiated polycaprolactone; 1,6-hexanediol initiated polycaprolactone; trimethylol propane initiated polycaprolactone; neopentyl glycol initiated polycaprolactone; polytetramethylene ether glycol initiated polycaprolactone; ethylene glycol initiated polycaprolactone; dipropylene glycol initiated polycaprolactone; and combinations thereof.

Suitable polyester polyols include, but are not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; o-phthalate-1,6-hexanediol polyester polyol; polyethylene terephthalate polyester polyols; and combinations thereof.

Suitable polycarbonate polyols include, but are not limited to, poly(phthalate carbonate) glycol, poly(hexamethylene carbonate) glycol, polycarbonate polyols containing bisphenol A, and combinations thereof.

Suitable hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and combinations thereof.

Other polyols that may be used to form the prepolymer include, but are not limited to, glycerols; castor oil and its derivatives; Polytail™ H and Polytail™ HA polyhydroxy polyolefin oligomers, commercially available from Mitsubishi Chemical; acrylic polyols; acid functionalized polyols based on a carboxylic, sulfonic, or phosphoric acid group; dimer alcohols converted from the saturated dimerized fatty acid; and combinations thereof.

By using polyols based on a hydrophobic backbone, the polyurethane composition may be more water resistant than those using polyols without a hydrophobic backbone. Non-limiting examples of polyols based on a hydrophobic backbone include hydrocarbon polyols, hydroxy-terminated polybutadiene polyols, polyethers, polycaprolactones, and polyesters.

In a particular embodiment, the polyol is PTMEG.

(b) Isocyanate

The polyol, optionally combined with the UV absorber, is reacted with an isocyanate component to form the prepolymer. Suitable isocyanates include aliphatic, cycloaliphatic, aromatic aliphatic, derivatives thereof, and combinations thereof having two or more isocyanate (NCO) groups per molecule. The isocyanates may be organic, modified organic, organic polyisocyanate-terminated prepolymers, or a combination thereof. The isocyanate-containing reactable component may also include any isocyanate-functional monomer, dimer, trimer, or multimeric adduct thereof, prepolymer, quasi-prepolymer, or combination thereof. Isocyanate-functional compounds may include monoisocyanates or polyisocyanates that include any isocyanate functionality of two or more.

Suitable isocyanate-containing components include diisocyanates having the general formula NCO—R—NCO, where R is preferably a cyclic or linear or branched hydrocarbon moiety containing from 1 to 20 carbon atoms. When multiple cyclic groups are present, linear and/or branched hydrocarbons containing from 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or combinations thereof.

Non-limiting examples of particularly suitable unsaturated isocyanates, i.e., aromatic compounds, include 2,2'-, 2,4'-, and 4,4'-diphenylmethane diisocyanate (MDI); 3,3'-dimethyl-4,4'-biphenyl diisocyanate (TODI); toluene diisocyanate (TDI); polymeric MDI; carbodimide-modified liquid 4,4'-diphenylmethane diisocyanate; para-phenylene diisocyanate (PPDI); meta-phenylene diisocyanate (MPDI); triphenylmethane-4,4'-, and triphenylmethane-4,4''-triisocyanate; napthylene-1,5,-diisocyanate; 2,4'-, 4,4'-, and 2,2'-biphenyl diisocyanate; polyphenylene polymethylene polyisocyanate (PMDI) (also known as polymeric PMDI); and combinations thereof.

Non-limiting examples of particularly suitable saturated isocyanates include ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and combinations thereof; modified polyisocyanate derived from the above isocyanates and polyisocyanates; and combinations thereof.

In a particular embodiment, the isocyanate is MDI.

(c) Curing Agent

The polyurethane prepolymer is reacted with a curing agent. The curing agent may consist of a single curing agent or comprise a combination of two or more curing agents, and optionally includes a freezing point depressing agent. Suitable curing agents include, but are not limited to, hydroxy-terminated curing agents, amine-terminated curing agents, and combinations thereof. The curing agent may be saturated or unsaturated.

Non-limiting examples of suitable curatives include 1,4-butanediol; 1,3-butanediol; 1,2-butanediol; 2,3-butanediol; 2,3-dimethyl-2,3-butanediol; propylene glycol, dipropylene glycol; polypropylene glycol; 2-methyl-1,3-propanediol; 2-methyl-1,4-butanediol; ethylene glycol; diethylene glycol; polyethylene glycol; resorcinol-di(beta-hydroxyethyl)ether and its derivatives; hydroquinone-di(beta-hydroxyethyl) ether and derivatives thereof; 2-propanol,1,1'-phenylamino-bis; trimethylolpropane; 4,4'-methylenebis(2-chloroaniline); 3,5-dimethylthio-2,4-toluenediamine; 3,5-dimethylthio-2,6-toluenediamine; 4,4'-methylenebis(2-ethylaniline); 4,4'-bis-(sec-butylamino)-diphenylmethane; 1,3-bis-(2-hydroxyethoxy)benzene; 1,3-bis-[2-(2-hydroxyethoxy)ethoxy] benzene; 1,3-bis-{2-[2-(2-hydroxyethoxy)ethoxy] ethoxy}benzene; 1,4-bis-(sec-butylamino) benzene; 1,2-bis-(sec-butylamino)benzene; 3,5-diethyltoluene-2,4-diamine; 3,5-diethyltoluene-2,6-diamine; tetra-(2-hydroxypropyl)-ethylenediamine; N,N'-dialkyldiamino diphenyl methane; trimethyleneglycol-di-p-aminobenzoate; polytetramethyleneoxide-di-p-aminobenzoate; 4,4'-methylene bis-(3-chloro-2,6-diethylaniline); 1,4-cyclohexyldimethylol; 2-methylpentamethylene diamine; isomers and mixtures of diaminocyclohexane; isomers and mixtures of cyclohexane bis(methylamine); polytetramethylene ether glycol; isomers and mixtures of cyclohexyldimethylol; triisopropanolamine; diethylene triamine; triethylene tetramine; tetraethylene pentamine; propylene diamine; dipropylene triamine; 1,3-diaminopropane; dimethylamino propylamine; diethylamino propylamine; diethylene glycol bis-(aminopropyl) ether; imido-bis-(propylamine); monoethanolamine; diethanolamine; triethanolamine; monoisopropanolamine; diisopropanolamine; isophoronediamine; N,N'-diisopropyl-isophoronediamine; polyoxypropylene diamine; propylene oxide-based triamine; 3,3'-dimethyl-4,4'-diaminocyclohexylmethane; 1,5-pentanediol; 1,6-hexanediol; glycerol; 1,3-bis-(2-hydroxyethoxy)cyclohexane; 1,3-bis[2-(2-hydroxyethoxy)ethoxy]cyclohexane; 1,3-bis-{2-[2-(2-hydroxyethoxy)ethoxy]ethoxy}cyclohexane; N,N,N',N'-tetra-(2-hydroxypropyl-ethylene) diamine; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; and combinations thereof.

In a particular embodiment, the curing agent is a dimethylthiotoluenediamine, e.g., Ethacure® 300 curative comprising dimethylthiotoluenediamine with a minor amount of monomethylthiotoluenediamine, commercially available from Albemarle Corporation.

The curing agent optionally comprises a freezing point depressing agent so that the freezing point of the blend is less than its normal freezing point temperature. The freezing point depressing agent is preferably compatible with the curing agent. For example, hydroxy-terminated curing agents, such as 1,4-butanediol, may be modified with a hydroxy-terminated freezing point depressing agent or a mixture of hydroxy-terminated freezing point depression agents. Examples of hydroxy-terminated freezing point depressing agents include, but are not limited to, 1,3-propanediol, 2-methyl-1,3-propanediol, 2-methyl-1,4-butanediol, 1,2-butanediol, 1,3-butanediol, ethylene glycol, diethylene glycol, 1,5-pentanediol, polytetramethylene glycol, propylene glycol, dipropylene glycol, and combinations thereof. Similarly, amine-terminated curing agents, such as hexamethylene diamine, may be modified with an amine-terminated freezing point depressing agent or a mixture of amine-terminated freezing point depressing agents. Examples of amine-terminated freezing point depressing agents include, but are not limited to, ethylene diamine, 1,3-diaminopropane, dimethylamino propylamine, tetraethylene pentamine, 1,2-propylenediamine, diethylaminopropylamine, 2,2,4-trimethyl-1,6-hexanediamine, 2,4,4-trimethyl-1,6-hexanediamine, and combinations thereof. The freezing point depressing agent is preferably added in an amount sufficient to reduce the freezing point of the curing agent by a suitable amount to prevent loss of pigment dispersion, but not affect the physical properties of the golf ball. Freezing point depressing agents are further disclosed, for example, in U.S. Pat. No. 7,888,449 to Wu, the entire disclosure of which is hereby incorporated herein by reference.

Suitable isocyanates, polyols, and curing agents are further disclosed, for example, in U.S. Patent Application Publication No. 2012/0015758 to Michalewich; U.S. Patent Application Publication No. 2012/0100935 to Michalewich; U.S. Pat. No. 6,528,578 to Wu; U.S. Pat. No. 6,506,851 to Wu; U.S. Pat. No. 7,148,278 to Bulpett; and U.S. patent application Ser. No. 13/534,264 to Michalewich; the entire disclosures of which are hereby incorporated herein by reference.

(d) Catalyst

A catalyst is optionally employed to promote the reaction between the polyol and the isocyanate and/or between the prepolymer and the curing agent. Suitable catalysts include, but are not limited to bismuth catalysts; zinc octoate; stannous octoate; tin catalysts, e.g., bis-butyltin dilaurate, bisbutyltin diacetate, stannous octoate, tin (II) chloride, tin (IV) chloride, bis-butyltin dimethoxide, dimethyl-bis[1-oxonedecyl)oxy]stannane, and di-n-octyltin bis-isooctyl mercaptoacetate; amine catalysts, e.g., triethylenediamine, triethylamine, and tributylamine; organic acids, e.g., oleic acid and acetic acid; delayed catalysts, e.g., Polycat® catalysts, commercially available from Air Products and Chemicals, Inc.; and combinations thereof.

(e) Additives and Fillers

Additional materials conventionally included in the polyurethane composition may be added to the prepolymer, the curing agent, or the resulting polyurethane composition. These additional materials include, but are not limited to, wetting agents, coloring agents, optical brighteners, crosslinking agents, whitening agents (e.g., $TiO_2$ and ZnO), UV absorbers, hindered amine light stabilizers, defoaming agents, processing aids, surfactants, and other conventional additives. Antioxidants, stabilizers, softening agents, plasticizers (including internal and external plasticizers), impact modifiers, foaming agents, density-adjusting fillers, reinforcing materials, and compatibilizers may also be added to the composition.

Fillers may be added to the polyurethane composition to affect rheological and mixing properties, the specific gravity (i.e., density-modifying fillers), the modulus, the tear strength, reinforcement, and the like. The fillers are generally inorganic, and typically include numerous metals, metal oxides and salts, e.g., zinc oxide, tin oxide, calcium oxide, barium sulfate, zinc sulfate, calcium carbonate, zinc carbonate, barium carbonate, clay, tungsten, tungsten carbide, silica, regrind (recycled core material typically ground to about 30 mesh particle), high-Mooney-viscosity rubber regrind, and combinations thereof.

(ii) Ionomers

An ionomer composition comprising an ethylene acid copolymer containing acid groups that are at least partially neutralized may be used to form the thermoplastic composition. In one embodiment, the neutralization level is greater than 70%. For example, the neutralization level may be at least 90%, and even at least 100% in some instances. Alternatively, the neutralization level may be less than 70%.

Suitable ethylene acid copolymers that may be used to form the respective compositions of this invention are generally referred to as copolymers of ethylene; $C_3$ to $C_8$ α, β-ethylenically unsaturated mono- or dicarboxylic acid; and optional softening monomer. Copolymers may include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

When a softening monomer is included, such copolymers are referred to herein as E/X/Y-type copolymers, wherein E is ethylene; X is a $C_3$ to $C_8$ α, β-ethylenically unsaturated mono- or dicarboxylic acid; and Y is a softening monomer. The softening monomer is typically an alkyl (meth) acrylate, wherein the alkyl groups have from 1 to 8 carbon atoms. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The metal cation salts provide the cations capable of neutralizing (at varying levels) the carboxylic acids of the ethylene acid copolymer and fatty acids, if present, as discussed further below. These include, for example, the sulfate, carbonate, acetate, oxide, or hydroxide salts of lithium, sodium, potassium, magnesium, calcium, barium, lead, tin, zinc, aluminum, manganese, nickel, chromium, copper, or a combination thereof. Preferred metal cation salts are calcium and magnesium-based salts. High surface area cation particles such as micro and nano-scale cation particles are preferred. The amount of cation used in the composition is readily determined based on desired level of neutralization.

For example, ionomeric resins having acid groups that are neutralized from about 10 percent to about 100 percent may be used. In one ionomer composition, the acid groups are partially neutralized. That is, the neutralization level is from about 10% to about 70%, more preferably 20% to 60%, and most preferably 30 to 50%. These ionomer compositions, containing acid groups neutralized to 70% or less, may be referred to ionomers having relatively low neutralization levels.

On the other hand, the ionomer composition may contain acid groups that are highly or fully-neutralized. These highly neutralized polymers (HNPs) are preferred for forming at least one core layer in the present invention. In these HNPs, the neutralization level is greater than 70%, preferably at least 90% and even more preferably at least 100%. In another embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In one preferred embodiment, a high acid ethylene acid copolymer containing about 19 to 20 wt. % methacrylic or acrylic acid is neutralized with zinc and sodium cations to a 95% neutralization level.

"Ionic plasticizers" such as organic acids or salts of organic acids, particularly fatty acids, may be added to the ionomer resin if needed. Such ionic plasticizers are used to make conventional ionomer composition more processable as described in Rajagopalan et al., U.S. Pat. No. 6,756,436, the disclosure of which is hereby incorporated by reference. In one preferred embodiment, the thermoplastic ionomer composition, containing acid groups neutralized to 70% or less, does not include a fatty acid or salt thereof, or any other ionic plasticizer. On the other hand, the thermoplastic ionomer composition, containing acid groups neutralized to greater than 70%, includes an ionic plasticizer, particularly a fatty acid or salt thereof. For example, the ionic plasticizer may be added in an amount of 10.0 to 50.0 pph. The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

As noted above, the final ionomer compositions may contain additional materials such as, for example, a small amount of ionic plasticizer, which is particularly effective at improving the processability of highly-neutralized ionomers. For example, the ionic plasticizer may be added in an amount of 10.0 to 50.0 pph. In addition to the fatty acids and salts of fatty acids discussed above, other suitable ionic plasticizers include, for example, polyethylene glycols, waxes, bis-stearamides, minerals, and phthalates. In another embodiment, an amine or pyridine compound is used, preferably in addition to a metal cation. Suitable examples include, for example, ethylamine, methylamine, diethylamine, tert-butylamine, dodecylamine, and the like.

The ionomer compositions may contain a wide variety of fillers and some of these fillers may be used to adjust the specific gravity of the composition as needed. High surface-area fillers that have an affinity for the acid groups in ionomer may be used. In particular, fillers such as particulate, fibers, or flakes having cationic nature such that they may also contribute to the neutralization of the ionomer are suitable. For example, aluminum oxide, zinc oxide, tin oxide, barium sulfate, zinc sulfate, calcium oxide, calcium carbonate, zinc carbonate, barium carbonate, tungsten, tungsten carbide, and lead silicate fillers may be used. Also, silica, fumed silica, and precipitated silica, such as those sold under the tradename, HISIL™ from PPG Industries, carbon black, carbon fibers, and nano-scale materials such as nanotubes, nanoflakes, nanofillers, and nanoclays may be used. Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, titanium dioxide, acid copolymer wax, surfactants, rubber regrind (recycled core material), clay, mica, talc, glass flakes, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the final thermoplastic ionomeric composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the ionomeric composition.

The ethylene acid copolymer is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of ethylene acid copolymer is about 40 to about 95 weight percent.

It also is recognized that the ionomer compositions may contain a blend of two or more ionomers. For example, the composition may contain a 50/50 wt. % blend of two different highly-neutralized ethylene/methacrylic acid copolymers. In another version, the composition may contain a blend of one or more ionomers and a maleic anhydride-grafted non-ionomeric polymer. The non-ionomeric polymer may be a metallocene-catalyzed polymer. In another version, the composition contains a blend of a highly-neutralized ethylene/methacrylic acid copolymer and a maleic anhydride-grafted metallocene-catalyzed polyethylene copolymer. In yet another version, the composition contains a material selected from the group consisting of highly-neutralized ionomers optionally blended with a maleic anhydride-grafted non-ionomeric polymer; polyester elastomers; polyamide elastomers; and combinations of two or more thereof.

A golf ball layer formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc.

(iii) Rubber-based Materials

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

Particularly suitable core materials include, but are not limited to, thermosetting materials, such as styrene butadiene, polybutadiene, isoprene, polyisoprene, and trans-isoprene; thermoplastics, such as ionomer resins, polyamides and polyesters; and thermoplastic and thermosetting polyurethane and polyureas. Particularly preferred core compositions are thermosetting rubber compositions comprising a base polymer, an initiator agent, a coagent and/or a curing agent, and optionally one or more of a metal oxide, metal fatty acid or fatty acid, antioxidant, soft and fast agent, fillers, and additives. Suitable base polymers include natural and synthetic rubbers including, but not limited to, polybutadiene, polyisoprene, ethylene propylene rubber ("EPR"), styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers and plastomers, copolymers of isobutylene and para-alkylstyrene, halogenated copolymers of isobutylene and para-alkylstyrene, acrylonitrile butadiene rubber, polychloroprene, alkyl acrylate rubber, chlorinated isoprene rubber, acrylonitrile chlorinated isoprene rubber, polyalkenamers, and combinations of two or more thereof. Suitable initiator agents include organic peroxides, high energy radiation sources capable of generating free radicals, C—C initiators, and combinations thereof. Suitable coagents include, but are not limited to, metal salts of unsaturated carboxylic acids; unsaturated vinyl compounds and polyfunctional monomers (e.g., trimethylolpropane trimethacrylate); phenylene bismaleimide; and combinations thereof. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof. Suitable types and amounts of base polymer, initiator agent, coagent, filler, and additives are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

III. Examples of Cover Materials

Golf balls formed according to the invention include at least one cover layer comprising a polyurethane composition of the present invention, and optionally include one or more cover layers formed from a suitable material other than a polyurethane composition of the present invention. Suitable cover materials are selected from polyurethanes, polyureas, and hybrids of polyurethane and polyurea; ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; non-ionomeric acid copolymers, e.g., ethylene (meth)acrylic acid; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. A particularly preferred inner cover layer material is an ionomer composition comprising a blend of Surlyn® 7940/Surlyn® 8940, optionally including a melt flow modifier.

Suitable conventional polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. patent application Ser. No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

In a particular embodiment, the cover comprises an inner cover layer formed from an ionomer composition and an outer cover layer formed from a polyurethane composition of the present invention.

IV. Examples of Coatings

Golf balls are typically finished by applying one or more finishing coats over the cover. For example, a primer and a topcoat may be applied. Either or both of the primer and topcoat compositions may be pigmented or clear. Several coats of clear or pigmented coatings may be applied.

Primer compositions are typically a solvent-borne or water-borne material, particularly selected from, but not limited to, polyurethanes, polyureas, acrylic polyurethanes, polyesters, polyester acrylics, and epoxies. In a particular embodiment, the primer composition is a two-part solvent-borne polyurethane comprising a resin component and an isocyanate component. In a particular aspect of this embodiment, the isocyanate component is present in an amount of from 31 parts to 35 parts, by weight per 100 parts of the resin component. In another particular aspect of this embodiment, the resin component comprises from 50 to 58 wt % solids and the isocyanate component comprises from 46 to 53 wt % solids. In another particular aspect of this embodiment, the resin component is SPU69723D from PPG Industries and the isocyanate component is GXH69725 from PPG Industries.

Topcoat compositions are typically a solvent-borne material particularly selected from, but not limited to, polyurethanes, polyureas, acrylic polyurethanes, polyesters, polyester acrylics, and epoxies. In a particular embodiment, the topcoat composition is a two-part solvent-borne polyurethane comprising a resin component and an isocyanate component. In a particular aspect of this embodiment, the isocyanate component is present in an amount of from 68 parts to 71 parts, by weight per 100 parts of the resin component. In another particular aspect of this embodiment, the resin component comprises from 46 to 52 wt % solids and the isocyanate component comprises from 46 to 53 wt % solids. In another particular aspect of this embodiment, the resin component is SPU61369K from PPG Industries and the isocyanate component is GXH69725 from PPG Industries.

Primer and topcoat compositions optionally include additives including, but not limited to, pigments, tints, dyes, fillers, reaction enhancers or catalysts, crosslinking agents, optical brighteners, propylene carbonates, such as those disclosed in U.S. Pat. No. 5,840,788, which is incorporated in its entirety by reference herein, coloring agents, fluorescent agents, whitening agents, UV absorbers, hindered amine light stabilizers, defoaming agents, processing aids, mica, talc, nano-fillers, wetting agents, solvents, and other conventional additives.

Non-limiting examples of suitable coatings are further disclosed, for example, in U.S. Pat. Nos. 5,409,233; 5,459,220; 5,494,291; 5,820,491; 5,669,831; 5,817,735; and 7,935,421, the entire disclosure of which are hereby incorporated herein by reference In a particular embodiment, golf balls of the present invention comprise at least one coat of primer and at least one coat of topcoat. In a particular aspect of this embodiment, the primer is a solvent-borne composition and the topcoat is a solvent-borne composition.

V. Golf Ball Construction

A golf ball of the invention, incorporating at least one layer comprising/consisting of a polymer composition comprising a mixture of a base polymer and at least one regenerating-type multi-functional antioxidant, advantageously is not limited to a particular golf ball construction, and can be disposed in connection with a variety of other layers in golf ball constructions targeting particular golf balls characteristics. In non-limiting examples, the at least one layer may comprise a rubber core sphere or layer, an ionomeric inner cover layer, a thermoset polyurethane outer cover layer, and/or a coating layer and in two-piece or multi-layer constructions and in wound or solid core golf balls, with any number of core, intermediate, cover, and/or coating layers.

Dimensions of golf ball components, i.e., thickness and diameter, may vary depending on the desired properties.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches.

In a particular embodiment, the core is a solid, single layer having a diameter within a range having a lower limit of 0.750 or 1.00 or 1.10 or 1.15 or 1.20 or 1.25 or 1.30 or 1.40 or 1.50 or 1.53 or 1.55 inches and an upper limit of 1.55 or 1.60 or 1.62 or 1.63 or 1.65 inches. In a particular aspect of this embodiment, the core has a center Shore C hardness of 95 or less, or 90 or less, or 85 or less, or 80 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the core has an outer surface Shore C hardness of 50 or greater, or 55 or greater, or 60 or greater, or 65 or greater, or 70 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the core has a low negative, low positive, or zero hardness gradient. In another particular aspect of this embodiment, the core is formed from a substantially homogeneous formulation and has a hardness gradient wherein the difference between the Shore C hardness of the outer surface and the Shore C hardness of the center of the core is within a range having a lower limit of −8 or −5 or −3 or 0 and an upper limit of 0 or 3 or 5 or 8.

In another particular aspect of this embodiment, the core has a compression of 90 or less, or 80 or less, or 75 or less, or 70 or less, or a compression within a range having a lower limit of 50 or 55 or 60 or 65 and an upper limit of 65 or 70 or 75 or 80 or 90.

In another particular embodiment, the core comprises an inner core layer and an outer core layer, the inner core layer having a diameter within a range having a lower limit of 0.900 or 0.910 or 0.920 or 0.930 or 0.940 or 0.950 or 0.960 or 0.970 or 0.980 or 0.990 or 1.000 or 1.010 or 1.020 inches and an upper limit of 1.020 or 1.030 or 1.040 or 1.050 or 1.060 or 1.070 or 1.080 or 1.090 or 1.100 or 0.110 or 1.120 or 1.130 inches, and the outer core having a thickness within the range having a lower limit of 0.050 or 0.100 or 0.200 or 0.250 inches and an upper limit of 0.280 or 0.310 or 0.440 or 0.500 inches. In a particular aspect of this embodiment, the inner core layer has a center Shore C hardness of 95 or less, or 90 or less, or 85 or less, or 80 or less, or 75 or less, or a center Shore C hardness within a range having a lower limit of 20 or 25 or 30 or 35 or 40 or 45 or 50 or 55 or 60 or 65 or 70 or 75 and an upper limit of 60 or 65 or 70 or 75 or 80 or 83 or 85 or 90 or 95, wherein the upper limit is greater than the lower limit (e.g., when the lower limit is 65, the upper limit is 70, 75, 80, 83, 85, 90, or 95). In another particular aspect of this embodiment, the inner core layer has an outer surface Shore C hardness of 50 or greater, or 55 or greater, or 60 or greater, or 65 or greater, or an outer surface Shore C hardness within a range having a lower limit of 40 or 45 or 50 or 55 or 60 or 65 or 70 or 74 and an upper limit of 60 or 65 or 70 or 74 or 75 or 78 or 80 or 85 or 90 or 95, wherein the upper limit is greater than the lower limit (e.g., when the lower limit is 65, the upper limit is 70, 74, 75, 78, 80, 85, 90, or 95). In another particular aspect of this embodiment, the inner core layer has a negative or zero hardness gradient. In another particular aspect of this embodiment, the inner core layer is formed from a substantially homogeneous formulation and the difference between the Shore C hardness of the outer surface of the inner core layer and the Shore C hardness of the center of the inner core layer is within a range having a lower limit of −20 or −15 or −10 and an upper limit of −10 or −5 or 0. In another particular aspect of this embodiment, the inner core layer has a compression of 50 or less, or 40 or less, or 30 or less, or a compression within a range having a lower limit of 10 or 15 or 20 or 25 and an upper limit of 25 or 30 or 40 or 50 or 65. In another particular aspect of this embodiment, the outer core layer has an outer surface Shore C hardness within a range having a lower limit of 70 or greater, or 75 or greater, or 80 or greater, or 85 or greater, or 89 or greater, or an outer surface Shore C hardness within a range having a lower limit of 70 or 75 or 80 or 85 or 89 and an upper limit of 80 or 85 or 90 or 93 or 95, wherein the upper limit is greater than the lower limit (e.g., when the lower limit is 85, the upper limit is 90, 93, or 95). In another particular aspect of this embodiment, the core has an overall dual core compression within a range having a lower limit of 60 or 70 or 80 or 85 and an upper limit of 85 or 90 or 95.

Golf ball covers of the present invention include single, dual, and multilayer covers, and preferably have an overall thickness within the range having a lower limit of 0.03 inches or 0.04 inches or 0.045 inches or 0.05 inches or 0.06 inches and an upper limit of 0.07 inches or 0.08 inches or 0.09 inches or 0.10 inches. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.020 or 0.025 or 0.030 or 0.035 inches and an upper limit of 0.035 or 0.040 or 0.045 or 0.050 or 0.100 inches, and the outer cover having a thickness within a range having a lower limit of 0.020 or 0.025 or 0.030 inches and an upper limit of 0.035 or 0.040 or 0.045 inches.

The present invention is not limited by any particular dimple pattern, dimple plan shape, dimple cross-sectional profile, or dimple size. Examples of suitable dimple patterns include, but are not limited to, phyllotaxis-based patterns; polyhedron-based patterns; and patterns based on multiple copies of one or more irregular domain(s) as disclosed in U.S. Pat. No. 8,029,388, the entire disclosure of which is hereby incorporated herein by reference; and particularly dimple patterns suitable for packing dimples on seamless golf balls. Non-limiting examples of suitable dimple patterns are further disclosed in U.S. Pat. Nos. 7,927,234, 7,887,439, 7,503,856, 7,258,632, 7,179,178, 6,969,327, 6,702,696, 6,699,143, 6,533,684, 6,338,684, 5,842,937, 5,562,552, 5,575,477, 5,957,787, 5,249,804, 5,060,953, 4,960,283, and 4,925,193, and U.S. Patent Application Publication Nos. 2006/0025245, 2011/0021292, 2011/0165968, and 2011/0183778, the entire disclosures of which are hereby incorporated herein by reference. Non-limiting examples of seamless golf balls and methods of producing such are further disclosed, for example, in U.S. Pat. Nos.

6,849,007 and 7,422,529, the entire disclosures of which are hereby incorporated herein by reference. In a particular embodiment, the dimple pattern is based on a spherically tiled tetrahedron. The dimples may have a variety of shapes and sizes including different depths and perimeters. In particular, the dimples may be concave hemispheres, or they may be triangular, square, hexagonal, catenary, polygonal or any other shape known to those skilled in the art. They may also have a cross-sectional profile based on any known dimple profile shape including, but not limited to, parabolic curves, ellipses, spherical curves, saucer-shapes, sine curves, truncated cones, flattened trapezoids, and catenary curves.

Golf balls of the present invention typically have a dimple count within a limit having a lower limit of 250 and an upper limit of 350 or 400 or 450 or 500. In a particular embodiment, the dimple count is 252 or 272 or 302 or 312 or 320 or 328 or 332 or 336 or 340 or 352 or 360 or 362 or 364 or 372 or 376 or 384 or 390 or 392 or 432.

By the present invention, it has been found that finishing golf balls with a particular coating system comprising a solventborne primer coat and a solventborne top coat as disclosed herein can improve aerodynamic properties compared to golf balls finished with a coating system comprising a waterborne primer coat and a solventborne top coat. For example, it has been found that with solventborne systems, the effective edge angle of the dimples is increased by about 0.5-0.75°, while the edge radius is decreased by about 0.005-0.010 inches, relative to waterborne systems. Thus, for the same edge angle, the solventborne system of the present invention exhibits improved stability.

In a particular embodiment, the present invention is directed to a golf ball comprising an inner core layer formed from a diene rubber composition and having a diameter of from 0.950 inches to 1.015 inches, a compression of 30 or less, a center Shore C hardness of from 65 to 75, a surface Shore C hardness of from 50 to 65, and a zero hardness gradient or a negative hardness gradient wherein the difference between the Shore C hardness of the outer surface of the inner core layer and the Shore C hardness of the center of the inner core layer is from −15 to −5, an outer core layer formed from a diene rubber composition and having a thickness of from 0.250 inches to 0.300 inches, and an outer surface Shore C hardness of from 85 to 95; an inner cover layer formed from an ionomer composition and having a thickness of from 0.030 inches to 0.040 inches, and an outer surface Shore C hardness of 93 or greater; and an outer cover layer formed from a polyurethane composition of the present invention, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat.

In another particular embodiment, the present invention is directed to a golf ball comprising a solid, single-layer core formed from a diene rubber composition and having a diameter of from 1.510 inches to 1.530 inches, a compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8; an inner cover layer formed from an ionomer composition and having a thickness of from 0.040 inches to 0.050 inches, and an outer surface Shore C hardness of 93 or greater; and an outer cover layer formed from a polyurethane composition of the present invention, and having a thickness of from 0.030 inches to 0.035 inches and an outer surface Shore C hardness of from 70 to 90. In a particular aspect of this embodiment, the golf ball additionally comprises a pigmented solvent-borne primer coat and a solvent-borne topcoat.

Meanwhile, advantageously, in a golf ball of the invention, a polymer composition of the at least one layer is versatile in that it can be formulated to comprise any desired golf ball layer and to possess a particular layer CoR in order to achieve a targeted overall golf ball CoR. Overall golf ball CoR may be targeted by coordinating the CoR of each subassembly of a golf ball. In this regard, a subassembly of any layer refers to that layer plus all the inner layers disposed within/underneath that layer. In this fashion, the center, the intermediate layers and the cover layer may be constructed to have different CoR's.

Thus, in one non-limiting example, a golf ball of the invention comprises a first subassembly, surrounded by a second subassembly which includes a layer of polymer composition. The first subassembly has a first coefficient of restitution that is less than a second coefficient of restitution of the second subassembly. Meanwhile, the golf ball as a whole, which also includes a cover disposed about the second subassembly, has a ball coefficient of restitution that is greater than the first coefficient of restitution and less than the second coefficient of restitution. The first subassembly can be, for example, a single core, or a dual core, or a core surrounded by an intermediate layer, or even a core, intermediate layer and inner cover layer, combined. In turn, the layer of polymer composition can be any golf ball layer as desired to achieve or target playing characteristics.

VI. Test Methods

Hardness

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center.

The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR")

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Moisture Transmission Rate

As used herein, the term "moisture vapor transmission rate" is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-94 entitled "Standard Test Method for Water Vapor Transmission Rate of Flexible Barrier Materials Using an Infrared Detection Technique," among others.

Examples of Suitable Golf Ball Manufacturing Methods/Processes

Golf balls of the invention may be formed using a variety of conventional application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entireties.

A method of injection molding using a split vent pin can be found in co-pending U.S. Pat. No. 6,877,974, filed Dec. 22, 2000, entitled "Split Vent Pin for Injection Molding." Examples of retractable pin injection molding may be found in U.S. Pat. Nos. 6,129,881; 6,235,230; and 6,379,138. These molding references are incorporated in their entirety by reference herein. In addition, a chilled chamber, i.e., a cooling jacket, such as the one disclosed in U.S. patent application Ser. No. 6,936,205, filed Nov. 22, 2000, entitled "Method of Making Golf Balls" may be used to cool the compositions of the invention when casting, which also allows for a higher loading of catalyst into the system.

Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

Castable reactive liquid polyurethanes and polyurea materials may be applied over the inner ball using a variety of application techniques such as casting, injection molding spraying, compression molding, dipping, spin coating, or flow coating methods that are well known in the art. In one embodiment, the castable reactive polyurethanes and polyurea material is formed over the core using a combination of casting and compression molding. Conventionally, compression molding and injection molding are applied to thermoplastic cover materials, whereas RIM, liquid injection molding, and casting are employed on thermoset cover materials.

U.S. Pat. No. 5,733,428, the entire disclosure of which is hereby incorporated by reference, discloses a method for forming a polyurethane cover on a golf ball core. Because this method relates to the use of both casting thermosetting and thermoplastic material as the golf ball cover, wherein the cover is formed around the core by mixing and introducing the material in mold halves, the polyurea compositions may also be used employing the same casting process.

For example, once a polyurea composition is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing urea mix for introducing cores into the mold halves is determined to be approximately between about 2,000 cP and about 30,000 cP, or within a range of about 8,000 cP to about 15,000 cP.

To start the cover formation, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 70 to about 80 seconds, a core is lowered at a controlled speed into the gelling reacting mixture.

A ball cup holds the shell through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting polyurea prepolymer and curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention.

However, golf balls of the invention may be made by any known technique to those skilled in the art.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted. It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

It is contemplated that "indicia" may be incorporated in golf balls of the invention. The term "indicia" is considered to mean any symbol, letter, group of letters, design, or the like, that can be added to a layer or surface of the golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient. A hardness gradient may exist within and/or between golf ball layers.

What is claimed is:

1. A golf ball having at least one layer comprising a polymer composition comprising a mixture of a base polymer and at least one regenerating-type multi-functional antioxidant; wherein the at least one regenerating-type multi-functional antioxidant has at least two differing moieties selected from the group consisting of phenols, phosphites, amines or combinations thereof; and wherein each regenerating-type multi-functional antioxidant has a molecular weight of from 5,000 g/mol to about 100,000 g/mol.

2. A golf ball having at least one layer comprising a polymer composition comprising a mixture of a base polymer and at least one regenerating-type multi-functional antioxidant; wherein the at least one regenerating-type multi-functional antioxidant has at least two differing moieties selected from the group consisting of phenols, phosphites, amines or combinations thereof; and wherein each regenerating-type multi-functional antioxidant has a molecular weight of from 10,000 g/mol to about 2,000,000 g/mol.

3. A golf ball having at least one layer comprising a polymer composition comprising a mixture of a base polymer and at least one regenerating-type multi-functional antioxidant, wherein the at least one regenerating-type multi-functional antioxidant has at least two differing moieties selected from the group consisting of phenols, phosphites, amines or combinations thereof; wherein each regenerating-type multi-functional antioxidant has a molecular weight of at least 2,000 g/mol; wherein the base polymer comprises an ionomer resin composition comprising at least one partially or fully neutralized ethylene-acid copolymer; and wherein the polymer composition has a moisture vapor transmission rate in the range of from about 0.45 to about 0.95 grams·mm/m$^2$·day.

4. The golf ball of claim 3, wherein the at least one layer comprises the at least one regenerating-type multi-functional antioxidant in an amount of from 0.10 parts by weight to about 2.5 parts by weight per 100 parts by weight of the base polymer.

5. The golf ball of claim 3, wherein the at least one layer comprises the at least one regenerating-type multi-functional antioxidant in an amount of less than 0.50 parts by weight per 100 parts by weight of the base polymer.

6. The golf ball of claim 3, wherein the at least one layer comprises the at least one regenerating-type multi-functional antioxidant in an amount of less than 0.095 parts by weight per 100 parts by weight of the base polymer.

7. The golf ball of claim 3, wherein the at least one layer comprises an inner cover layer surrounding a subassembly, has a thickness of from about 0.020 inches to about 0.050 inches, and a Shore D hardness of from about 40 to about 75.

8. The golf ball of claim 3, wherein the base polymer comprises a thermoset polyurethane composition.

9. The golf ball of claim 8, wherein the polymer composition comprises a mixture of the at least one regenerating-type multi-functional antioxidant and a reaction mixture of at least one polyol and at least one isocyanate.

10. The golf ball of claim 8, wherein the polymer composition comprises a reaction mixture of a curing agent and a mixture of a prepolymer and the at least one regenerating-type multi-functional antioxidant.

11. The golf ball of claim 3, wherein the base polymer comprises: 100 phr of base rubber(s); from about 0.1 phr to about 5.0 phr of initiator(s); up to about 2.5 phr of organosulfur compound(s); from about 5.0 phr to about 50.0 phr of co-agent(s); up to about 50 phr of filler(s); and up to about phr of additives(s).

12. A golf ball comprising:
a solid, single-layer core formed from a diene rubber composition and having a diameter of from 1.510 inches to 1.530 inches, an Atti compression of from 65 to 80, a center Shore C hardness of from 65 to 75, a surface Shore C hardness of from 65 to 75, and a zero hardness gradient or a negative or positive hardness gradient wherein the difference between the Shore C hardness of the outer surface of the core and the Shore C hardness of the center of the core is from −8 to 8;
an inner cover layer formed from an ionomer composition and having a thickness of from 0.040 inches to 0.050 inches and an outer surface Shore C hardness of 93 or greater;
an outer cover layer formed from a polyurethane composition and having a thickness of from 0.020 inches to 0.035 inches and an outer surface Shore C hardness of from 75 to 90;
a pigmented solvent-borne primer coat; and
a solvent-borne top coat;
wherein the outer cover layer polyurethane composition comprises a reaction product of a prepolymer and a curing agent, wherein the prepolymer is a reaction product of a polyol mixture and a diisocyanate, wherein the polyol mixture comprises at least one regenerating-type multi-functional antioxidant.

13. The golf ball of claim 12, wherein the at least one regenerating-type multi-functional antioxidant has at least two differing moieties selected from the group consisting of phenols, phosphites, or amines or combinations thereof.

14. The golf ball of claim 13, wherein each regenerating-type multi-functional antioxidant has a molecular weight of at least 2,000 g/mol.

15. The golf ball of claim 14, wherein each regenerating-type multi-functional antioxidant has a molecular weight of at least 5,000 g/mol.

16. The golf ball of claim 13, wherein each regenerating-type multi-functional antioxidant has a molecular weight of greater than 2,000 g/mol.

17. The golf ball of claim 13, wherein the outer cover layer polyurethane composition further comprises at least one UV absorber.

18. The golf ball of claim 17, wherein the UV absorber is a 2-(2H-benzotriazol-2-yl)-4-(1,1,3,3-tetramethylbutyl)phenol UV absorber.

* * * * *